(12) United States Patent
Morcelli et al.

(10) Patent No.: US 9,286,382 B2
(45) Date of Patent: Mar. 15, 2016

(54) METHOD AND SYSTEM FOR SIMULTANEOUS PLAYBACK OF AUDIO TRACKS FROM A PLURALITY OF DIGITAL DEVICES

(71) Applicant: STMicroelectronics S.r.l., Agrate Brianza (IT)

(72) Inventors: Alessandro Morcelli, Montello (IT); Marco Veneri, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 264 days.

(21) Appl. No.: 14/038,377

(22) Filed: Sep. 26, 2013

(65) Prior Publication Data

US 2014/0094944 A1    Apr. 3, 2014

(30) Foreign Application Priority Data

Sep. 28, 2012  (IT) .............................. MI2012A1617

(51) Int. Cl.

| | |
|---|---|
| *G06F 17/30* | (2006.01) |
| *H04H 60/92* | (2008.01) |
| *H04H 60/80* | (2008.01) |
| *H04N 21/414* | (2011.01) |
| *H04N 21/81* | (2011.01) |
| *H04N 21/41* | (2011.01) |
| *H04N 21/4367* | (2011.01) |
| *H04N 21/432* | (2011.01) |
| *H04L 7/00* | (2006.01) |
| *H04J 3/06* | (2006.01) |
| *H04N 21/8358* | (2011.01) |

(52) U.S. Cl.
CPC ........... *G06F 17/3074* (2013.01); *H04H 60/80* (2013.01); *H04H 60/92* (2013.01); *H04L 7/0008* (2013.01); *H04N 21/4126* (2013.01); *H04N 21/41407* (2013.01); *H04N 21/4325* (2013.01); *H04N 21/4367* (2013.01); *H04N 21/8106* (2013.01); *H04N 21/8358* (2013.01); *H04J 3/0632* (2013.01); *H04R 2420/07* (2013.01)

(58) Field of Classification Search
CPC . G06F 3/16; G06F 17/3074; G06F 17/30743; G06F 1/02; G10L 19/018; H04N 21/4307; G10H 1/0083; G10H 2240/171; H04H 20/18; H04H 60/80; H04H 60/92
USPC .................. 700/94; 381/56, 77, 79; 455/3.06
See application file for complete search history.

(56) References Cited

U.S. PATENT DOCUMENTS

| | | | | |
|---|---|---|---|---|
| 7,539,551 B2 * | 5/2009 | Komura et al. | .................. | 700/94 |
| 7,747,338 B2 * | 6/2010 | Korhonen | ....................... | 700/94 |

(Continued)

FOREIGN PATENT DOCUMENTS

WO    2009/098669 A2    8/2009

*Primary Examiner* — Jesse Elbin
(74) *Attorney, Agent, or Firm* — Seed IP Law Group PLLC

(57) ABSTRACT

A method for simultaneous playback of audio tracks from digital transceiver devices, which are adapted to define a communication network. The digital devices store audio tracks to be played. One of the digital devices is actuated as a Master device (M) and the remaining N digital devices as Slave devices. The master device generates a pilot signal by selecting a pilot audio track to be played from among stored audio tracks and by adding a synchronization frequency ($f_S$) to the pilot audio track, having an assigned value that falls out of the sound wave frequency range. The Slave devices receive a pilot portion of the pilot signal and extract the synchronization frequency and the received part of the pilot audio track. The slave devices use the pilot to identify a stored track to be played using the synchronization frequency as a sampling frequency.

33 Claims, 5 Drawing Sheets

(56) References Cited

U.S. PATENT DOCUMENTS

| | | |
|---|---|---|
| 7,996,700 B2 | 8/2011 | Celinski et al. |
| 2003/0198257 A1 | 10/2003 | Sullivan et al. |
| 2005/0160270 A1* | 7/2005 | Goldberg et al. ............ 713/176 |
| 2006/0190968 A1* | 8/2006 | Jung et al. .................... 725/74 |
| 2006/0270395 A1 | 11/2006 | Dhawan et al. |
| 2007/0087686 A1* | 4/2007 | Holm et al. ................. 455/3.06 |
| 2008/0077261 A1* | 3/2008 | Baudino et al. ................ 700/94 |
| 2008/0225826 A1 | 9/2008 | Gentric |

* cited by examiner

METHOD AND SYSTEM FOR SIMULTANEOUS PLAYBACK OF AUDIO TRACKS FROM A PLURALITY OF DIGITAL DEVICES

BACKGROUND

1. Technical Field

The present disclosure relates to a method for simultaneous playback of audio tracks from a plurality of digital devices.

The disclosure also relates to a system for simultaneous playback of audio tracks from a plurality of digital transceiver devices.

The disclosure also relates to digital devices such as mobile cell phones and the following description is given with particular reference to this field of application.

2. Description of the Related Art

In recent years, considerable interest has been focused on techniques for synchronizing digital audio contents in systems with local communication networks, in which wireless apparatus, mobile phones, smartphones and other high-speed digital devices simultaneously play the same audio content.

In this context in which the same audio content is simultaneously played by two or more mobile phones, two requirements are known to be imposed:

synchronized playback, for the audio content to be played at the same time on all the mobile phones;

tuned playback, which means that the audio content must be played at the same frequency to prevent echoes during audio content playback on all the mobile phones.

Digital devices are known to have a specific sampling frequency other than the sampling frequency of other similar digital devices.

Therefore, during simultaneous playback of the same audio track, the difference between the sampling frequencies of the digital devices is perceived by a listener, as an untuned sound, e.g., a sound with echo.

Echo is substantially the resultant of the individual playbacks, as schematically shown in FIG. 1, in the case of two individual playbacks with different sampling frequencies.

A solution to the above drawbacks is based on processing of the audio track received by the individual device and stored as a digital signal. Such processing uses complex algorithms for controlling the buffer of the stored digital signal and aligning audio playback buffers of two digital devices.

A second solution is disclosed in the US patent application No. US2003/0198257 by Sullivan et al., which teaches the use of graphical user interfaces for manually synchronizing the playback of a received digital audio signal.

Another solution is disclosed in the US patent application No. US2008/0225826 by Gentric, in which the playback of an audio broadcast over a network with a plurality of digital devices, is synchronized by selecting a device for reception and simultaneously preventing the other unselected devices from receiving and playing the audio broadcast through the creation of suitable echoes.

While these solutions are satisfactory in certain respects, they still have drawbacks mainly associated by their complex implementation.

BRIEF SUMMARY

An embodiment relates to a method for simultaneous playback of audio tracks from a plurality of digital transceiver devices, which are adapted to define a communication network; the method comprising the steps of:

providing storage means in said digital devices, comprising audio tracks to be played, actuating one of said digital devices as a Master device and actuating the remaining digital devices of the communication network as Slave devices.

An embodiment facilitates simultaneous playback of optimally received audio tracks. An embodiment provides a method that facilitates simple and effective determination of a tuning frequency for audio track playback to reduce the formation of echoes during playback.

An embodiment includes recognition of the audio track to be played and temporal overlapping of the played audio tracks.

An embodiment reduces implementation complexity.

In an embodiment, a tuning step tunes the digital devices of the network and simultaneously plays the audio track, and overlapping it on the audio track being received.

In an embodiment, a method of simultaneous playback of audio tracks from digital transceiver devices, which are adapted to define a communication network, comprises the steps of: providing storage means in said digital devices, comprising audio tracks to be played; actuating one of said digital devices as a Master device and actuating the remaining digital devices as Slave devices; characterized in that it comprises the following steps: in said Master device: generating a pilot signal, by selecting a pilot audio track to be played from among said audio tracks stored in said storage means and by adding a synchronization frequency to said pilot audio track, said synchronization frequency having an assigned value, said assigned value falling out of the sound wave frequency range; sending said pilot signal in said communication network; and, in said Slave devices: receiving a pilot portion of said pilot signal and extracting said synchronization frequency from said pilot portion; extracting the received part of said pilot audio track contained in said pilot portion; comparing said received part with corresponding portions of said audio tracks in said storage means and selecting a second audio track comprising said received part of said pilot audio track; playing said second audio track using said extracted synchronization frequency as a sampling frequency, thereby generating an output audio signal simultaneous to said pilot audio track being received. In an embodiment, said synchronization frequency falls in the ultrasound frequency range. In an embodiment, said synchronization frequency is equal to the sampling frequency of said Master device or a fraction thereof. In an embodiment, extracting said synchronization frequency comprises: filtering said pilot portion to remove said received part of said pilot audio track and generate a reference signal; processing said reference signal, through a PLL (Phase-Locked Loop) circuit, to detect the frequency of said reference signal. In an embodiment, said step of playing said second audio track in synchronism with said pilot audio track being received comprises: determining a first receiving period for reception of said pilot signal to define said pilot portion; computing the time interval that was taken to select said second audio track and determine a second receiving period by adding said time interval to said first receiving period; comparing said pilot track received in the second period with said second audio track that has been selected and determining a storage address in said storage means, said storage address being adapted to locate the portion to be played of said pilot audio track, in said second audio track; and retrieving said second audio track from said storage means based on said storage address. In an embodiment, the method comprises, in each digital device: coupling an inter-device element to the storage means; receiving said audio tracks to be played through said inter-device element; storing said plurality of received audio tracks in said storage means and associating respective storage addresses thereto. In an embodiment, the method comprises: creating a list of said Slave devices; storing said list in said Master device; and cyclically and sequentially sending said pilot signal to said Slave devices of said list, thereby ensuring sequential playback of output audio signals, simultaneous with the pilot audio track contained in the respective pilot signal. In an embodiment, said reception of said pilot signal occurs through a microphone that is part of said digital devices. In an embodiment, at least one of said digital devices is at least one of a mobile phone, a smartphone, an iPad, an iPod, a video game console, and a wireless speaker device that form a wireless network in an environment.

In an embodiment, a system for simultaneous playback of audio tracks from (N+1) digital devices adapted to form a communication network, said (N+1) digital devices comprising a receiver, a transmitter and storage means, having audio tracks to be played, one of said digital devices being adapted to be actuated as a Master device and said remaining digital devices being adapted to be actuated as Slave devices $(S_1, \ldots S_N)$; said system being wherein said Master device comprises means for selecting a pilot audio track from among said audio tracks stored in said storage means and means for generating and sending a pilot signal, which comprises said pilot audio track and a synchronization frequency, said synchronization frequency having an assigned value, that falls out of the sound wave frequency range, said Slave devices comprising: a detector block coupled to said receiver and adapted to process at least one pilot portion of said received pilot signal to extract said synchronization frequency; a comparator block coupled to said receiver and to said storage means, said comparator block being adapted to compare the received part of said pilot audio track, which is contained in said pilot portion, with corresponding portions of said audio tracks stored in said storage means, to select a second audio track comprising said received part of said pilot audio track; a sampling block coupled to said storage means and to said detector block, said sampling block being adapted to sample said selected second audio track at said synchronization frequency, thereby generating an output audio signal simultaneous to said audio track being received. In an embodiment, said synchronization frequency falls in the ultrasound frequency range. In an embodiment, said synchronization frequency is equal to the sampling frequency of said Master device or a fraction thereof. In embodiment, said detector block comprises a high-pass filter connected in series to a Phase-Locked Loop circuit, said filter being adapted to filter the pilot signal to generate a reference signal without the pilot audio track and said Phase-Locked Loop being adapted to detect the frequency of said reference signal. In an embodiment each of said digital devices comprises an inter-device element for storing said audio tracks in said storage means, said inter-device element of said Master device being adapted to identify said Slave devices of said communication network. In an embodiment, each Slave device comprises a microphone, which is adapted to receive said pilot signal. In an embodiment, at least one of said digital devices is a mobile phone, a smartphone, an iPad, an iPod, a video game console, a wireless speaker device, for forming a wireless network in an environment.

In an embodiment, a method comprises: generating, using a master device of a communication network, a pilot signal including at least a portion of an audio track and a synchronization signal; transmitting the generated pilot signal; receiving, by at least one other device of the communication network, the transmitted pilot signal; retrieving, by the at least one other device and based on the pilot signal, a stored copy of the audio track; and synchronizing playback of the audio track by the master device with playback of the retrieved copy of the audio track by the at least one other device based on the synchronization signal included in the received pilot signal. In an embodiment, the transmitting the generated pilot signal comprises playing the pilot signal on a speaker of the master device and the receiving comprises receiving the pilot signal with a microphone. In an embodiment, a frequency of the synchronization signal is an ultrasound frequency. In an embodiment, the frequency of the synchronization signal comprises one of a sampling frequency of the master device and a fraction of the sampling frequency of the master device. In an embodiment, the synchronizing playback comprises determining a sampling frequency of the at least one other device of the communication network based on the synchronization signal included in the pilot signal. In an embodiment, the determining the sampling frequency of the at least one other device comprises: filtering the received pilot signal to extract the synchronization signal; detecting a frequency of the synchronization signal using a Phase-Locked Loop (PLL). In an embodiment, the synchronizing playback comprises compensating for a delay introduced by processing of the pilot signal by the at least one other device. In an embodiment, the delay is based on a period of time to determine a frequency of the synchronization signal and a period of time to retrieve the stored copy of the audio track. In an embodiment, the compensating for the delay comprises waiting a threshold period of time before beginning playback of the stored copy. In an embodiment, the compensating for the delay comprises adjusting a starting position of playback of the stored copy. In an embodiment, the retrieving the stored copy of the audio track comprises comparing at least part of the at least a portion of the audio track to corresponding parts of audio tracks stored in a memory of the at least one other device. In an embodiment, the method comprises: receiving one or more audio tracks by the at least one other device via an inter-device transceiver; and storing of the received one or more audio tracks by the at least one other device. In an embodiment, the at least one other device is one of a plurality of slave devices and the method comprises: creating a list of said Slave devices; storing said list in said Master device; and cyclically and sequentially sending pilot signals to said Slave devices of said list. In an embodiment, the at least one other device comprises one or more of a mobile phone, a smartphone, an iPad, an iPod, a video game console, and a wireless speaker device.

In an embodiment, a device comprises: an input configured to receive pilot signals including synchronization signals and all or portions of respective audio tracks; a frequency detector coupled to the input and configured to extract synchronization signals from received pilot signals; a comparator coupled to the input and configured to identify audio tracks to play back based on received pilot signals; and a sampling block configured to sample identified audio tracks based on extracted synchronization signals. In an embodiment, the device comprises a microphone configured to receive the pilot signal. In an embodiment, the frequency detector comprises a high-pass filter configured to pass ultrasound frequencies and a phase-locked-loop. In an embodiment, the sampling block is configured to compensate for delay introduced by the frequency detector and the comparator. In an embodiment, the device comprises a memory to store audio tracks, wherein the comparator is configured to compare portions of audio tracks included in pilot signals to corresponding portions of audio tracks stored in the memory. In an embodiment, the device comprises: an inter-device transceiver; and a memory configured to store audio tracks received through the inter-device transceiver.

In an embodiment, a device comprises: a memory configured to store audio tracks; an audio track selector configured to select audio tracks to playback; a pilot signal generator configured to generate pilot signals including all or portions of selected audio tracks and one or more synchronization signals; and a transmitter configured to transmit generated pilot signals. In an embodiment, the transmitter comprises an audio speaker. In an embodiment, a frequency of a synchronization signal is an ultrasound frequency. In an embodiment, the device comprises: an inter-device transceiver. In an embodiment, the device is a master device in a communication network, the memory is configured to store a list of slave devices of the communication network, and the device is configured to sequentially transmit pilot signals to slave devices on the list of slave devices.

In an embodiment, a system comprises: a receiver configured to receive pilot signals including synchronization signals and all or portions of respective audio tracks; a frequency detector coupled to the receiver and configured to extract synchronization signals from received pilot signals; a comparator coupled to the input and configured to identify audio tracks to play back based on received pilot signals; a sampling block configured to sample identified audio tracks based on extracted synchronization signals; and a transmitter configured to play identified audio tracks. In an embodiment, the receiver is a microphone. In an embodiment, the frequency detector comprises a high-pass filter configured to pass ultrasound frequencies and a phase-locked-loop. In an embodiment, the sampling block is configured to compensate for delay introduced by the frequency detector and the comparator. In an embodiment, the system comprises a memory to store audio tracks, wherein the comparator is configured to compare portions of audio tracks included in pilot signals to corresponding portions of audio tracks stored in the memory.

In an embodiment, a system comprises: means for receiving pilot signals including respective synchronization signals and all or portions of audio tracks; means for generating sampling signals based on received pilot signals; means for identifying audio tracks to playback based on received pilot signals; and means for synchronizing playback of identified audio tracks based on generated sampling signals. In an embodiment, the system comprises: means for communicating with other devices; and means for storing audio tracks received through the means for communicating. In an embodiment, the system comprises: means for selecting audio tracks to playback; and means for generator pilot signals including all or portions of selected audio tracks and one or more synchronization signals.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, microphones, speakers, transistors, antennas, transponders, processors, diodes, controllers, power supplies, memories, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
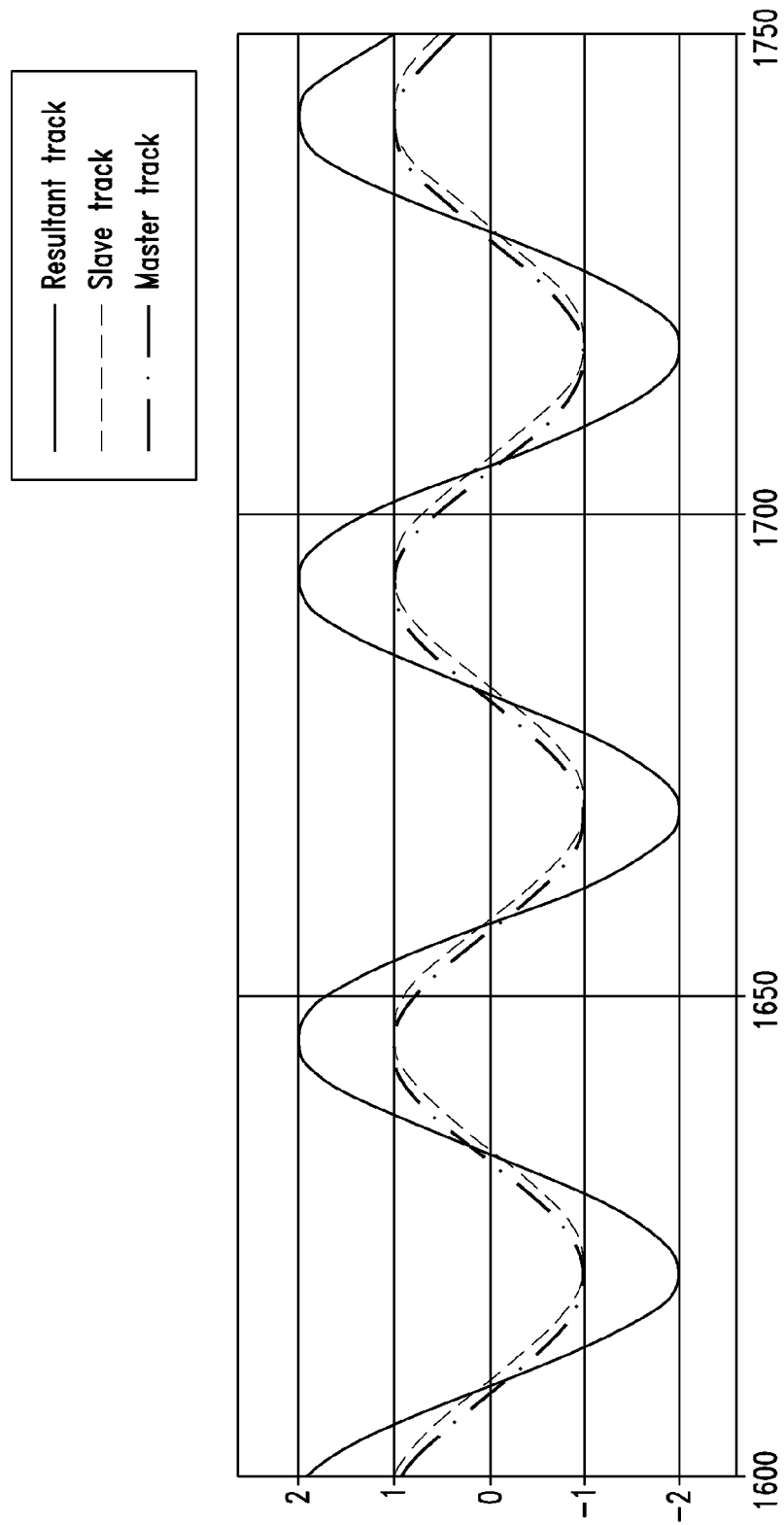
FIG. 1 shows a diagram with untuned audio playbacks from prior art digital devices.
Figure 2:
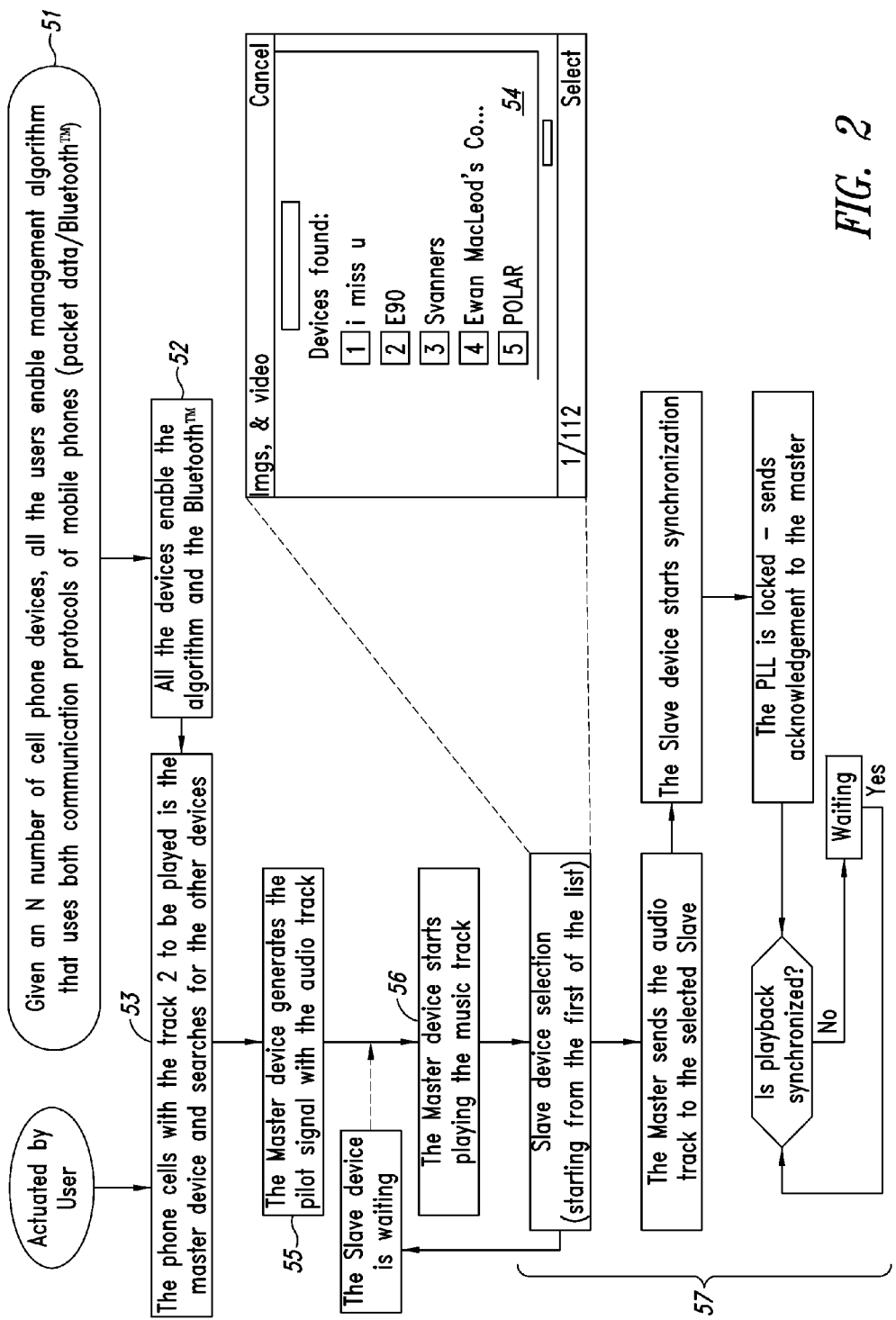
FIG. 2 is a schematic block diagram of the synchronization method according to an embodiment.
Figure 3:
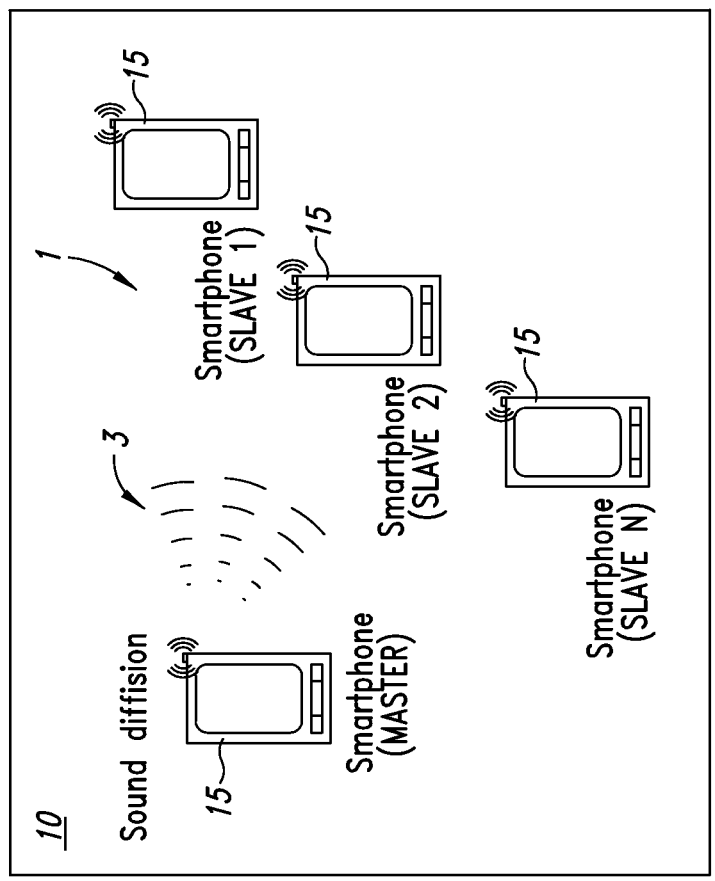
FIG. 3 is a schematic view of a communication network comprising digital devices according to an embodiment.
Figure 4:
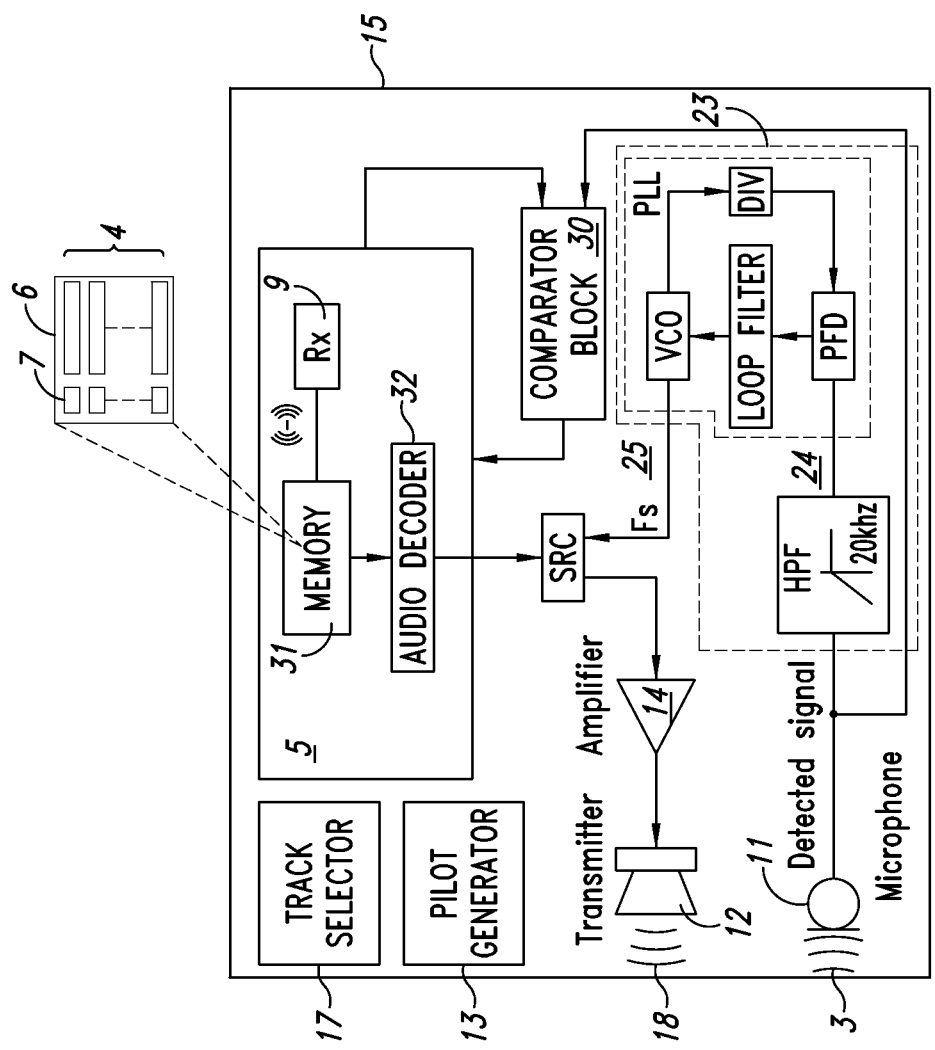
FIG. 4 is a schematic block diagram of a digital device according to an embodiment.

Referring to FIGS. 2-4, there is shown a block diagram of an embodiment of a method and devices for simultaneous playback of audio tracks from a plurality (N+1) of digital transceivers 15.

In an embodiment, as schematically shown in FIG. 4, each digital device 15 has a receiver 11 and a transmitter 12.

The (N+1) digital devices 15 are adapted to form a local communication network 10, e.g., a LAN or WAN network, having an appropriate communication protocol.

The digital devices 15 may be mobile devices having mobile phone and data management functions, such as tablets, personal computers, video game consoles, and featuring multimedia applications that may be factory-installed or added upon request.

In an embodiment, the digital devices 15 may include fixed devices such as wireless audio players or wireless speakers which are adapted to form a network for synchronized playback in a given environment.

The method first comprises a setup step 51, in which each digital device 15 of the communication network 10 is provided with the communication protocol and one or more inter-device elements 9 or wi-fi transceivers, allowing communication of the digital devices 15 with one another and short-range packet data transmission and reception. An inter-device element 9 may be, for instance, a module which facilitates communication based on a standard, such as Bluetooth™ and the like.

The step 51 includes providing storage means 5 in each digital device 15, which means have a memory 31 for storage of the audio tracks 6 received through the inter-device element 9.

In an embodiment, the memory 31 is a virtual memory such as a RAM (Random Access Memory) or the like.

Furthermore, the step 51 allows each stored audio track 6 to be associated with a corresponding storage address 7.

The method comprises enabling 52 the management of algorithms and inter-device elements 9 for each digital device 15.

The method further comprises the step of actuating 53 a digital device 15 of the communication network 10 as a Master device M to send an audio track 2 (see FIG. 5) to be played to the N remaining digital devices 15, which are actuated as Slave devices $S_1, \ldots S_N$.

Furthermore, the method comprises the step of generating 55 a pilot signal 3 by the Master device M. This step 55 comprises:

selecting a pilot audio track 2 from among the audio tracks 6 stored in said storage means 5 and adding a synchronization frequency $f_S$ to the pilot audio track 2 to be played.

The synchronization frequency $f_S$ has an assigned value, which falls out of the range of sound wave frequencies audible by a user [typically 20 Hz-20 KHz]. In an embodiment, the synchronization frequency $f_S$ is a value that falls within the ultrasound frequency range.

In an embodiment, the synchronization frequency $f_S$ is equal to the sampling frequency $f_M$ of the Master device M.

In an embodiment, the synchronization frequency $f_S$ is calculated as a fraction of the sampling frequency $f_M$ of the Master device M, according to the playback capability of the transmitter 12 contained in each Slave device $S_1, \ldots S_N$.

Figure 5:
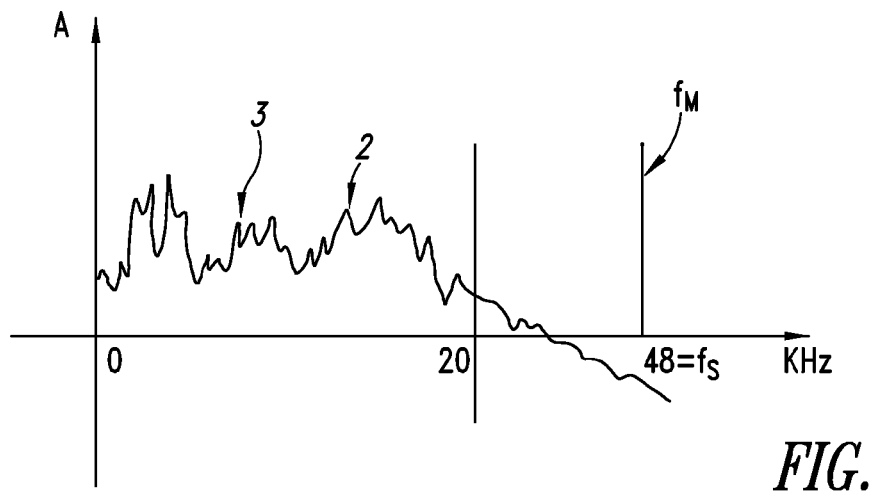
FIGS. 5 and 6 are schematic views of two steps of a method according to an embodiment.
Figure 6:
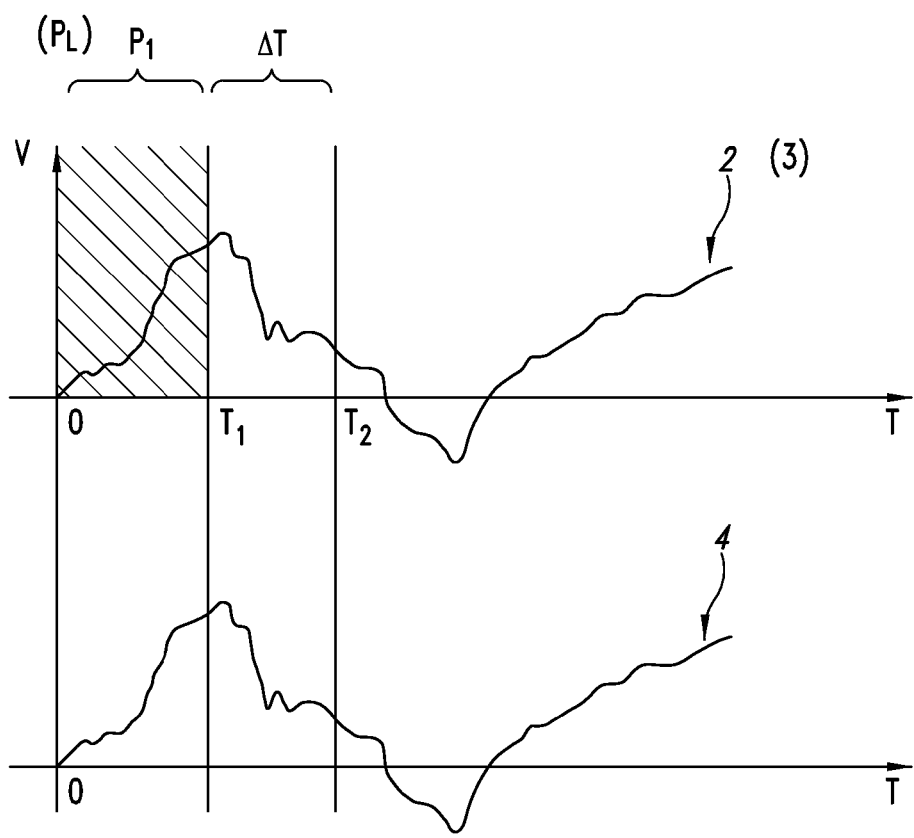

As schematically shown in FIG. 5, the spectral content of the generated pilot signal 3 comprises the audio track 2, that has components to a frequency of 20 kHz, and the sampling frequency $f_M$, which is, for instance, equal to 48 kHz.

The synchronization frequency $f_S$ introduced into the pilot signal 3 substantially defines a tuning tone that is listened, e.g., isolated and extracted by each Slave device $S_1 \ldots S_N$ and is used in each Slave device $S_1 \ldots S_N$ to play the pilot audio track 2 included in the pilot signal 3 transmitted by the Master device M.

In an embodiment, the method comprises sending 56 the pilot signal 3 so generated, through the Master device M, to each Slave device $S_1, \ldots S_N$ of the communication network 10.

In an embodiment, the method comprises using the speaker of the Master device M as a transmitter 12 and the microphone of each Slave device $S_1 \ldots S_N$ as a receiver 11.

In said Slave devices $S_1, \ldots S_N$, an embodiment of a method comprises:

receiving a pilot portion of the pilot signal 3 that has been sent and extracting 57 the synchronization frequency $f_S$ from the received pilot portion $P_L$.

In an embodiment, the synchronization frequency is extracted using a PLL (Phase Locked-Loop) circuit, as more clearly explained hereinafter.

In an embodiment, the method comprises:

extracting the received part $P_1$ of the pilot audio track 2 contained in the received pilot portion $P_L$ of the pilot signal 3;

comparing the received part with corresponding portions of the audio tracks 6 stored in the storage means 5 and, as a result of the comparison selecting a second audio track 4 from among the audio tracks 6, which comprises the received part $P_1$ of the pilot audio track 2.

Then, the method comprises playing the second audio track 4 so selected in each Slave device $S_1, \ldots S_N$, in synchronism with the pilot audio track 2 being received, using the extracted synchronization frequency $f_S$ as a sampling frequency.

Thus, each Slave device $S_1, \ldots S_N$ autonomously generates an output audio signal 18 simultaneous to the pilot audio track 2 being received.

In an embodiment, extracting the synchronization frequency $f_S$ comprises:

filtering the pilot portion $P_L$ of the pilot signal 3 to remove the audio track 2 and generate a reference signal 24; and detecting by using a control system, such as the PLL circuit, the frequency of the reference signal 24, which is associated with the synchronization frequency $f_S$ contained in the received pilot signal 3.

The PLL circuit allows generation of an output signal 25 whose frequency is the frequency of the reference signal 24, e.g., the synchronization frequency $f_S$ of the received pilot signal 3.

In an embodiment of a method, playing the second audio track 4 in synchronism with the pilot audio track 2 being received comprises:

determining a first receiving period $T_1$ in which the portion $P_1$ is received from a clock signal within each Slave device $S_1, \ldots S_N$;

calculating the time interval $\Delta t$ that was taken to select the second audio track 4 in said storage means 5, and determining second receiving period $T_2$ by adding the time interval $\Delta t$ to the first receiving period $T_1$.

In an embodiment, this step comprises:

an additional comparison step, in which the pilot audio track 2 received in the second period $T_2$ is compared with the second audio track 4 that has been selected to determine a storage address 7, for locating the remaining portion to be played of the pilot audio track 2 being received, in the memory 31 of said storage means 5.

In an embodiment, this step comprises retrieving the second audio track 4 from the memory 31, starting from the identified storage address 7, and then playing the second audio track 4 so retrieved at the extracted synchronization frequency $f_S$.

In an embodiment, the method comprises comparing the audio tracks by a comparator block 30, which is connected to the microphone 11 and the storage means 5, for example using an audio decoder 32.

In an embodiment, the method comprises playing the second audio track 4 through the PLL circuit to generate an output audio signal 18. Namely, a sampling block, SRC, is used to re-sample the second audio track 4 received from the audio decoder 32, and such second audio track 4 is sent to a transmitter 12 which is connected in series to an amplifier 14, and is designed to generate the output audio signal 18.

At least one preset time delay and a corresponding track delay might be introduced before playing the second audio track 4 or before determining the storage address 7, to account for the delays of the comparison and selection steps.

In an embodiment, a method facilitates simultaneous playback, e.g., time-synchronized and frequency-tuned playback, of the output audio signal 18 generated by each slave device $S_1, \ldots S_N$ and the audio track 2 being received.

In an embodiment, each Slave device $S_1, \ldots S_N$ of the communication network 10 plays the remaining portion of the second audio track 4 that has been selected, simultaneously with the audio track 2 being received, but after a waiting time specific for each Slave device $S_1, \ldots S_N$.

In an embodiment, the master device M is actuated and all the Slave transmitters $S_1, \ldots S_N$ simultaneously receive the pilot signal 3. The master device M may be actuated manually by a user, or automatically by reception of an actuation signal in a manner known per se.

In an embodiment, the method comprises repetitive and sequential playback of the audio track 2 by selective selection of the Slave transmitters $S_1, \ldots S_N$ from a predefined list 54.

In an embodiment, a method comprises the steps of:

creating a list 54 of Slave devices $S_1, \ldots S_N$ that define the communication network 10;

storing the list 54 in the Master device M; and cyclically and sequentially or randomly sending the pilot signal 3 to each Slave device $S_1, \ldots S_N$ of the list 54, thereby ensuring sequential playback of output audio signals 18, which are played simultaneously with the pilot audio track 2 contained in the respective pilot signal 3.

In an embodiment, a system is configured for simultaneous playback of audio tracks from a plurality of digital devices according to the method as described above, in which details and cooperating parts having the same structure and function will be designated by the same reference numerals and letters, unless the context indicates otherwise, as also shown in the annexed figures.

The system 1 comprises (N+1) digital transceiver devices 15 which define a local communication network 10, e.g., a LAN or WAN network, having a communication protocol.

Each digital device 15 comprises a receiver 11 or microphone, a transmitter 12 or speaker and one or more inter-device elements 9 or wi-fi receivers, for communication of the (N+1) digital devices 15 with one another and to facilitate short-range packet data transmission and reception. An inter-device element 9 may be, for instance, a device or module compatible with a standard, such as the Bluetooth™ Standard and the like.

Each digital device 15 also comprises storage means 5, which have a memory 31 for storing a plurality of audio tracks 6 and associating each stored audio track 6 with a corresponding storage address 7. The system 1 has one of the (N+1) digital devices 15 of the network 10, actuated or identified as a Master device M, designed for transmission of an audio track 2 to be played. The system 1 has the remaining N digital devices 15 actuated or identified as Slave transmitters $S_1, \ldots S_N$, designed to receive and play the received audio signal 2.

The Master device M comprises selection means for selecting a pilot audio track 2, as illustrated, a track selector 17, from among the audio tracks 6 stored in the memory 31, and means for generating and sending a pilot signal 3 to the Slave devices $S_1, \ldots S_N$ of the local communication network 10, as illustrated a pilot generator 13.

The pilot signal 3 comprises the pilot audio track 2 and a synchronization frequency $f_S$. The synchronization frequency $f_S$ has an assigned value, which may fall out of the range of sound wave frequencies audible by a user [typically, 20 Hz-20 KHz]. For example, the synchronization frequency $f_S$ may be a value that falls within the ultrasound frequency range.

In an embodiment, the synchronization frequency $f_S$ is equal to the sampling frequency $f_M$ of the Master device M.

In an embodiment, the synchronization frequency $f_S$ is calculated as a fraction of the sampling frequency $f_M$ of the Master device M, and may be calculated according to the playback capability of the transmitter 12 of each Slave device $S_1, \ldots S_N$.

In other words, the synchronization frequency $f_S$ is substantially a tuning tone that is added to any audio track 6 stored in the memory 31, to obtain the pilot signal 3 that is sent to the Slave devices $S_1 \ldots S_N$ through the communication network 10.

FIG. 5 schematically shows the spectral content of the pilot signal 3 comprising, according to an embodiment, the pilot audio track 2 that has components to a frequency of 20 kHz, and the sampling frequency $f_M$, which is, for instance, equal to 48 kHz.

In an embodiment, the Master device M plays the pilot signal 3 so generated through the transmitter 12 that is connected in series to an amplifier 14.

In an embodiment, if one of the digital devices 15 is mobile phones, the receiver 11 of the device may be the microphone of the mobile phone.

Furthermore, the selection means for selecting the pilot audio track 2 may be manual means, operable by a user of the mobile phone, or automatic means, for example if a predefined program sequentially or randomly selects the audio tracks 2 for playback.

Conveniently, each Slave device $S_1, \ldots S_N$ may comprise a detector block 23 connected in series to the receiver 11, which is adapted to process at least one pilot portion $P_L$ of the received pilot signal 3, for extraction of the sampling frequency $f_S$ and the portion $P_1$ of the pilot audio track 2.

The detector block 23 comprises a high-pass filter HPF and a Phase Locked-Loop PLL, connected in series. The HPF filter filters the pilot portion $P_L$ of the pilot signal 3 to generate a reference signal 24 without the audio track part 2 contained in the pilot portion $P_L$. The reference signal 24 may be substantially a sinusoidal signal.

The PLL circuit processes the reference signal 24 to obtain the sampling frequency that corresponds to the tuning frequency $f_S$ contained in the pilot signal 3.

The PLL circuit allows generation of an output signal 25 whose frequency is the frequency of the received pilot signal 3.

In an embodiment, each Slave transmitter $S_1, \ldots S_N$ comprises an audio decoder 32 associated with the memory 31 and adapted to retrieve an appropriately selected second audio track 4 stored in said memory 31.

A comparator block 30 is coupled to the storage means 5 and the receiver 11. The comparator block 30 is adapted to compare the received part $P_1$ of the pilot audio track 2 with corresponding portions of the audio tracks 6 stored in the memory 31 of the storage means 5, and select a second audio track 4 which comprises the received part $P_1$ of the pilot audio track 2.

The comparator block 30 may also be adapted to synchronize the second audio track 4 with the pilot audio track 2 being received.

In an embodiment, the comparator block 30 compares the second audio track 4 identified in the memory 31 with the received audio track 2 and calculates a storage address 7 that substantially defines the part of the audio track 2 received by the Slave device $S_1, \ldots S_N$.

In an embodiment, each Slave device $S_1 \ldots S_N$ comprises computing means with an internal clock, not shown, which define a first receiving period $T_1$ for reception of the pilot portion $P_L$ of the pilot signal 3.

The computing means may also be adapted to determine a time interval $\Delta t$ in which the comparator block 30 of each Slave device $S_1, \ldots S_N$ selects the second audio track 4 in said storage means 5.

Then, a second receiving period $T_2$ is determined, by adding the time interval $\Delta t$ to the first receiving period $T_1$. The time period $T_2$ is an estimate of the time to determine the storage address 7 that defines, in the selected second audio track 4, the part of the received audio track 2.

In an embodiment, each Slave device $S_1, \ldots S_N$ comprises, in said storage means 5, an audio decoder 32 coupled to said comparator block 30 and to said memory 31 and adapted to retrieve the selected second audio track 4 based on the storage address 7.

A sampling block, SRC, coupled to the storage means 5 and the detector block 23, samples the second audio track 4 retrieved by the audio decoder 32 at the synchronization frequency obtained by the PLL circuit. Thus, an output audio signal 18 is generated and transmitted by each Slave device S1, ... SN through the transmitter 12 that is connected in series to the amplifier 14.

The output audio signal 18 so generated is a playback simultaneous, e.g., time-synchronized and frequency-tuned, to the audio track 2 that is transmitted at the same time by the Master device M.

In an embodiment, the Master device M comprises identifying means, e.g., the inter-device 9 or Bluetooth™ element, that are adapted for identifying the Slave devices $S_1, \ldots S_N$ operating in the communication network 10 and generating a corresponding list 54.

Thus, the Master device M comprises an additional selector, for identifying each Slave device $S_1, \ldots S_N$ in the list 54, and for cyclically and sequentially sending the pilot signal 3 to each of such devices, and allow audio playback simultaneous to the audio track 2 that has been sent.

The digital device 15 may be selected from a group of devices comprising: mobile phones, smartphones, iPads, iPods, video game consoles or wireless speaker devices that can form a system for playback in synchronism with a wireless network in a given environment.

In an embodiment, the audio track is played by the Slave devices at the same time as the pilot signal is received or after reception of a start signal.

In an embodiment, simple and optimal simultaneous playback of received audio tracks is facilitated.

In an embodiment, the tuning tone, e.g., the sampling frequency of the Master device sent to each Slave device, avoids complex processing and considerably reduces the likelihood of errors, while considerably increasing synchronization efficiency.

In an embodiment, the method and system are of the "open" type, e.g., the digital devices that form the communication network may be simply added to or removed from the communication network at any time, for example by being recognized or disabled by the Master device.

In an embodiment, the tone added to the pilot audio track facilitates quicker determination of the sampling frequency and considerably simplifies processing of the signal to be played.

Those skilled in the art will obviously appreciate that a number of changes and variants may be made to the arrangements as described hereinbefore to meet incidental and specific needs, without departure from the scope of the disclosure.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, using a master device of a communication network, a pilot signal including at least a portion of an audio track and a synchronization signal;
transmitting the generated pilot signal;
receiving, by at least one other device of the communication network, the transmitted pilot signal;
retrieving, by the at least one other device and based on the pilot signal, a stored copy of the audio track; and
synchronizing playback of the audio track by the master device with playback of the retrieved copy of the audio track by the at least one other device based on the synchronization signal included in the received pilot signal.

2. The method of claim 1 wherein the transmitting the generated pilot signal comprises playing the pilot signal on a speaker of the master device and the receiving comprises receiving the pilot signal with a microphone.

3. The method of claim 2 wherein a frequency of the synchronization signal is an ultrasound frequency.

4. The method of claim 3 wherein the frequency of the synchronization signal comprises one of a sampling frequency of the master device and a fraction of the sampling frequency of the master device.

5. The method of claim 1 wherein the synchronizing playback comprises determining a sampling frequency of the at least one other device of the communication network based on the synchronization signal included in the pilot signal.

6. The method of claim 5 wherein the determining the sampling frequency of the at least one other device comprises:
filtering the received pilot signal to extract the synchronization signal;
detecting a frequency of the synchronization signal using a Phase-Locked Loop (PLL).

7. The method of claim 1 wherein the synchronizing playback comprises compensating for a delay introduced by processing of the pilot signal by the at least one other device.

8. The method of claim 7 wherein the delay is based on a period of time to determine a frequency of the synchronization signal and a period of time to retrieve the stored copy of the audio track.

9. The method of claim 7 wherein the compensating for the delay comprises waiting a threshold period of time before beginning playback of the stored copy.

10. The method of claim 7 wherein the compensating for the delay comprises adjusting a starting position of playback of the stored copy.

11. The method of claim 1 wherein the retrieving the stored copy of the audio track comprises comparing at least part of the at least a portion of the audio track to corresponding parts of audio tracks stored in a memory of the at least one other device.

12. The method of claim 1, comprising:
receiving one or more audio tracks by the at least one other device via an inter-device transceiver; and
storing of the received one or more audio tracks by the at least one other device.

13. The method of claim 1 wherein the at least one other device is one of a plurality of slave devices and the method comprises:
creating a list of said Slave devices;
storing said list in said Master device; and
cyclically and sequentially sending pilot signals to said Slave devices of said list.

14. The method of claim 1 wherein the at least one other device comprises one or more of a mobile phone, a smartphone, an iPad, an iPod, a video game console, and a wireless speaker device.

15. A device, comprising:
an input configured to receive pilot signals including synchronization signals and all or portions of respective audio tracks;
a frequency detector coupled to the input and configured to extract synchronization signals from received pilot signals;
a comparator coupled to the input and configured to identify audio tracks to play back based on received pilot signals; and
a sampling block configured to sample identified audio tracks based on extracted synchronization signals.

16. The device of claim 15, comprising a microphone configured to receive the pilot signal.

17. The device of claim 15 wherein the frequency detector comprises a high-pass filter configured to pass ultrasound frequencies and a phase-locked-loop.

18. The device of claim 15 wherein the sampling block is configured to compensate for delay introduced by the frequency detector and the comparator.

19. The device of claim 15, comprising a memory to store audio tracks, wherein the comparator is configured to compare portions of audio tracks included in pilot signals to corresponding portions of audio tracks stored in the memory.

20. The device of claim 15, comprising:
an inter-device transceiver; and
a memory configured to store audio tracks received through the inter-device transceiver.

21. A device, comprising:
a memory configured to store audio tracks;
an audio track selector configured to select audio tracks to playback;
a pilot signal generator configured to generate a pilot signal, the pilot signal including:
all or portions of a selected audio track to identify and retrieve the audio track; and
one or more synchronization signals added to the all or portions of the selected audio track to synchronize playback of the audio track; and
a transmitter configured to transmit the generated pilot signal.

22. The device of claim 21 wherein the transmitter comprises an audio speaker.

23. The device of claim 22 wherein a frequency of a synchronization signal is an ultrasound frequency.

24. The device of claim 21, comprising:
an inter-device transceiver.

25. The device of claim 24 wherein the device is a master device in a communication network, the memory is configured to store a list of slave devices of the communication network, and the device is configured to sequentially transmit pilot signals to slave devices on the list of slave devices.

26. A system, comprising:
a receiver configured to receive pilot signals including synchronization signals and all or portions of respective audio tracks;
a frequency detector coupled to the receiver and configured to extract synchronization signals from received pilot signals;
a comparator coupled to the input and configured to identify audio tracks to play back based on received pilot signals;
a sampling block configured to sample identified audio tracks based on extracted synchronization signals; and
a transmitter configured to play identified audio tracks.

27. The system of claim 26 wherein the receiver is a microphone.

28. The system of claim 26 wherein the frequency detector comprises a high-pass filter configured to pass ultrasound frequencies and a phase-locked-loop.

29. The system of claim 26 wherein the sampling block is configured to compensate for delay introduced by the frequency detector and the comparator.

30. The system of claim 26, comprising a memory to store audio tracks, wherein the comparator is configured to compare portions of audio tracks included in pilot signals to corresponding portions of audio tracks stored in the memory.

31. A system, comprising:
means for receiving pilot signals including respective synchronization signals and all or portions of audio tracks;
means for generating sampling signals based on received pilot signals;
means for identifying audio tracks to playback based on received pilot signals; and
means for synchronizing playback of identified audio tracks based on generated sampling signals.

32. The system of claim 31, comprising:
means for communicating with other devices; and
means for storing audio tracks received through the means for communicating.

33. The system of claim 31, comprising:
means for selecting audio tracks to playback; and
means for generator pilot signals including all or portions of selected audio tracks and one or more synchronization signals.

* * * * *